(12) United States Patent
Schantz et al.

(10) Patent No.: US 7,975,923 B1
(45) Date of Patent: Jul. 12, 2011

(54) OPTICAL SIGNATURE SYSTEM AND METHOD

(75) Inventors: Howard J. Schantz, Inver Grove Heights, MN (US); Brian L. Uhlhorn, St. Paul, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 79 days.

(21) Appl. No.: 12/146,836

(22) Filed: Jun. 26, 2008

(51) Int. Cl.
- *G06K 7/10* (2006.01)
- *G06K 7/14* (2006.01)
- *G01J 3/45* (2006.01)
- *G01N 21/00* (2006.01)
- *G01N 1/10* (2006.01)
- *G02B 26/02* (2006.01)

(52) U.S. Cl. ........ 235/454; 235/435; 356/246; 356/432; 356/440; 356/442; 356/451; 359/228

(58) Field of Classification Search .................. 235/454; 356/451, 71, 246, 432, 433, 436, 440, 442; 359/228

See application file for complete search history.

(56) References Cited

U.S. PATENT DOCUMENTS

| | | | | |
|---|---|---|---|---|
| 5,204,381 A | * | 4/1993 | Zeigler | 522/148 |
| 5,258,821 A | * | 11/1993 | Doggett et al. | 356/496 |
| 5,452,076 A | * | 9/1995 | Schopper et al. | 356/128 |
| 6,111,831 A | * | 8/2000 | Alon et al. | 369/47.16 |
| 6,873,415 B2 | * | 3/2005 | Amonette et al. | 356/432 |
| 7,184,622 B2 | | 2/2007 | Uhlhorn et al. | |
| 2002/0084329 A1 | * | 7/2002 | Kaye et al. | 235/462.01 |
| 2003/0020915 A1 | * | 1/2003 | Schueller et al. | 356/436 |
| 2005/0037484 A1 | * | 2/2005 | Staimer et al. | 435/287.2 |
| 2005/0148100 A1 | * | 7/2005 | Su et al. | 436/523 |
| 2005/0244305 A1 | * | 11/2005 | Fujita | 422/102 |
| 2006/0096358 A1 | * | 5/2006 | Fauver et al. | 73/61.72 |
| 2006/0098192 A1 | * | 5/2006 | Van den Brink et al. | 356/246 |
| 2008/0262321 A1 | * | 10/2008 | Erad et al. | 600/301 |
| 2009/0161100 A1 | * | 6/2009 | Minot et al. | 356/244 |

OTHER PUBLICATIONS

Co-pending U.S. Appl. No. 12/146,810, filed Jun. 26, 2008.

* cited by examiner

*Primary Examiner* — Michael G Lee
*Assistant Examiner* — Laura Gudorf
(74) *Attorney, Agent, or Firm* — Hamre, Schumann, Mueller & Larson, P.C.

(57) ABSTRACT

A system and method for creating a unique optical signature that uses a plurality of optical signature chambers containing fluids having differing optical properties, for example differing indices of refraction, that produce different individual optical signatures for each chamber. If the chambers are broken causing the fluids to spill or the fluids are otherwise discharged from the chambers, the fluids mix together so one does not know which fluid came from which chamber, thereby preventing replication of the correct optical signatures. This destruction of the optical signatures can occur mechanically, without the application or presence of electrical power.

21 Claims, 2 Drawing Sheets

OPTICAL SIGNATURE SYSTEM AND METHOD

FIELD

This disclosure relates to a system and method for creating a unique optical signature.

BACKGROUND

There are many different applications for unique signatures or identifiers. For example, a unique signature can be used to uniquely identify a specific physical object within a group. One example of the use of a unique signature is a unique number that is calculated and assigned to a piece of electronic equipment. If that unique number is not recalculated correctly upon attempted operation of the electronic equipment, thereby indicating possible tampering with the equipment, then the electronic equipment is not allowed to operate. Another area of use of a unique signature is in encryption technology in which a unique encryption key is generated and stored in non-volatile random access memory.

In certain applications, particularly high security applications, it is important to prevent unauthorized access to the unique signature in order to prevent duplication or replication of the signature that can, for example, be used to gain unauthorized access to sensitive data or allow unauthorized use of equipment. In the case of current encryption technology, the encryption key is intended to be erased from memory if an unauthorized person tries to access the encryption key. However, this active erasure approach requires active power or a battery source, which is not necessarily always present. Additionally, the erasure timeline of an active erasure approach may be too long for some application environments.

SUMMARY

A system and method are described for creating a unique optical signature that uses a plurality of optical signature chambers containing fluids having differing optical properties that produce different individual optical signatures for each chamber. If the chambers are broken causing the fluids to spill or the fluids are otherwise discharged from the chambers, the fluids mix together so one does not know which fluid came from which chamber thereby preventing replication of the correct individual optical signatures and preventing replication of the correct arrangement of the individual optical signature. This destruction of the optical signatures can occur mechanically, without the application or presence of electrical power.

The resulting unique optical signature of the system is created by directing light through the fluid of each optical signature chamber and detecting the resulting optical signature that is produced by the fluid in each chamber. The individual optical signature of each signature chamber can be unique to that signature chamber, or some of the signature chambers can share the same individual optical signature. The individual optical signatures of each chamber together form an overall resulting unique optical signature of the system.

The resulting unique optical signature can be used in any of a large number of applications including, but not limited to, the construction of an encryption key or uniquely identifying an object such as an electronic device. Any application that would benefit from using a unique signature could utilize the system and method described herein.

In one embodiment, an optical signature system includes at least one light source, and at least two optical signature chambers each defining an interior space containing fluid. The fluids have differing optical properties whereby the optical signature chambers have differing individual optical signatures. An optical signature detector detects light from one or more of the at least two optical signature chambers as a result of light being directed through the optical signature chambers. In one embodiment, a plurality of optical signature detectors are provided that electrically detect the differing individual and resulting optical signatures of the optical chambers as a result of light being directed therethrough.

The detected optical signatures can then be processed, for example by comparing the resulting detected light patterns with stored patterns to determine if there is a match, or by comparing values representative of the intensities of the detected light signatures with stored intensity values.

An encryption key can be created using the optical signature chambers. If the detected optical signatures are determined to be valid, a correct key is generated that can be used to encrypt/decrypt data.

DRAWINGS

DETAILED DESCRIPTION

Figure 1:
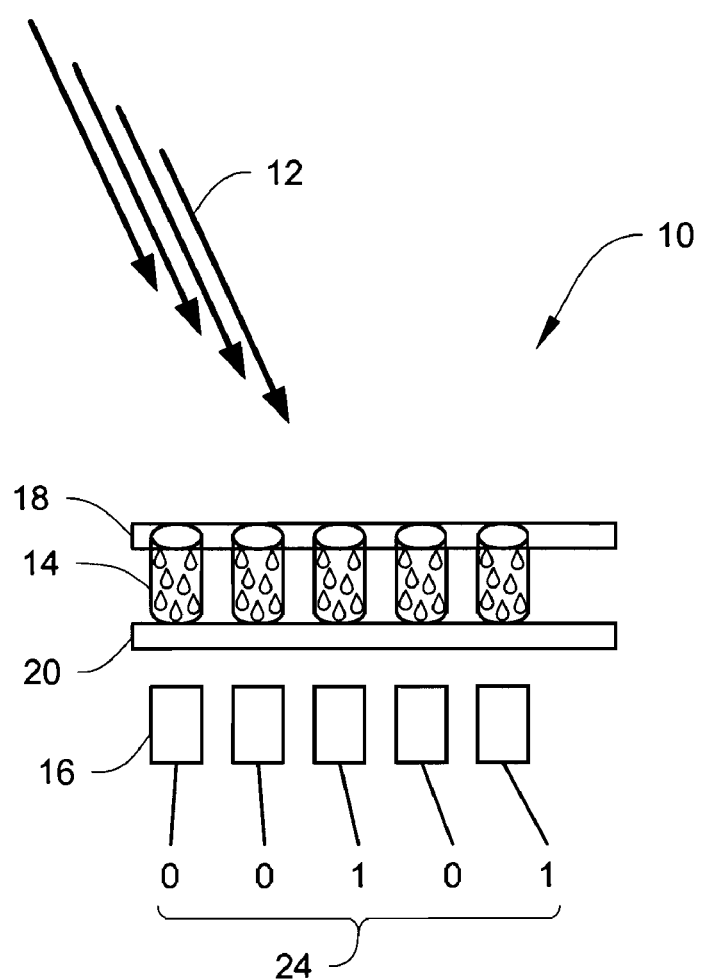
FIG. 1 depicts an optical signature system.

With reference to FIG. 1, an optical signature system 10 is illustrated. The system 10 includes at least one light source 12, at least one optical signature chamber 14, and at least one optical signature detector 16. The light source 12 is intended to direct light into and through the chamber 14 which is designed to create a unique optical signature as a result of refraction and/or reflection of the light as the light passes through the chamber. The optical signature can be the resulting pattern of light or portion of the pattern emerging from the chamber 14, the intensity of one or more pixels of light emerging from the chamber 14, or any other measure of the light emerging from the chamber 14. The detector 16 is designed to detect the resulting unique optical signature produced by the chamber 14 as the light emerges from the chamber. The detector 16 may resolve a single point or an array of points and will accept light from at least one optical signature chamber. The detector 16 can be, for example, a pin diode that produces a single intensity output, or a charge-coupled device (CCD) which receives a relatively wider area of light and produces an array of values as an output, i.e. an image, each relating intensity or color.

As used herein, the optical signature produced by each optical signature chamber 14 will be referred to as an individual optical signature. The individual optical signatures of the chambers 14 together form a resulting unique optical signature for the system 10. In some circumstances, the light waves emerging from the individual optical signature chambers 14 may continue to interact and interfere with each other as they exit the optical chambers, and it is the result of the interfering and interacting light waves that is detected and forms the resulting optical signature of the system.

Figure 2:
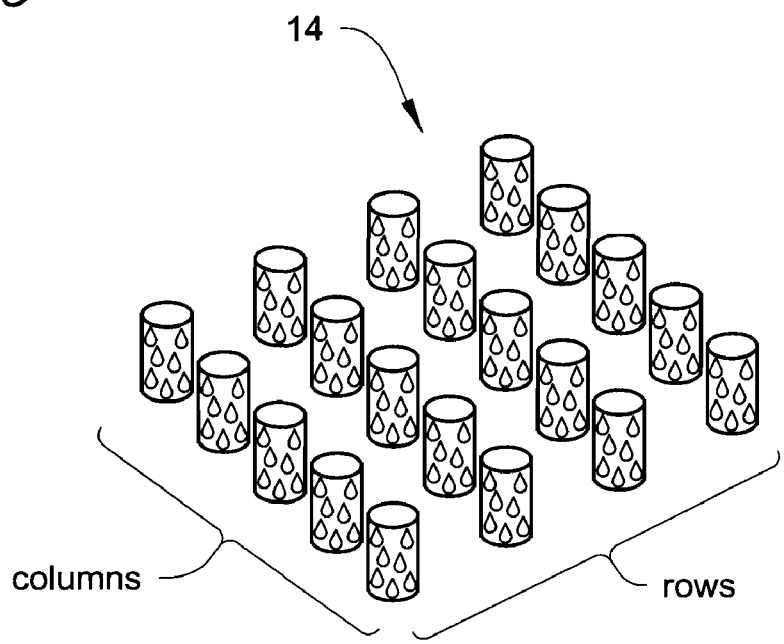
FIG. 2 is a top perspective view of a plurality of optical signature chambers arranged into an array.

The number of chambers 14 and the arrangement of the chambers in a pattern or array can vary based on a number of factors, including the particular security application and how many different individual optical signatures need to be created. The chambers 14 are arranged adjacent to one another so as to receive the light from the light source 12. As shown in FIG. 2, the chambers 14 can be arranged into a pattern, for example an array of rows and columns, for example four rows and five columns. At least two chambers 14 having differing individual optical signatures is required. The larger the number of chambers 14, the more individual optical signatures that are created and in general the more unique the resulting optical signature of the system 10. However, for the same number of chambers 14, changing the pattern of the chambers and the locations of the various chambers in the pattern alters the resulting unique optical signature for the entire system 10.

Covers 18, 20 can be provided over the ends of the chambers 14 to close off the ends of the chambers 14. The covers 18, 20 are designed to allow passage of light waves into and from the chambers 14. The covers 18, 20 can be, for example, made of a material that permits passage of the light, such as clear glass. Alternatively, the covers 18, 20 can be light transmissive only in the locations where they directly cover the chambers.

A single or multiple light sources 12 can be used for directing light into the chamber(s) 14. In the illustrated embodiment, the light source(s) 12 and the chambers 14 are arranged so that the light enters through a longitudinal end of the chambers, and exits through an opposite longitudinal end. If multiple light sources are used, there can be one light source for each chamber 14 or multiple chambers can share a common light source. The light provided by the light source 12 is preferably visible light, more preferably monochromatic light, for example coherent light from a laser. However, in certain applications, other types of visible light, such as white light, could be used. In addition, non-visible light, for example infra-red light, could be used. Any light source that provides a light wave that can be detected by a suitable optical detector 16 after passing through the signature chamber(s) 14 can be used.

The number and type of detectors 16 used corresponds to, for example, the uniqueness required for the application. The detectors 16 can be any optical detector that can detect the light that emerges from at least one chamber 14. For example, the detectors 16 can be an array of photodetectors. In the illustrated embodiment, there is at least one detector 16 for each chamber 14. It is to be realized that each sensor can receive light that emerges from its associated chamber, as well as light that emerges from one or more adjacent chambers. Each detector 16 can be of a type that produces a single bit of information, such as a pin diode. Alternatively, the detectors 16 can be, for example, CCD imaging sensors which can generate an array of values corresponding to a variation in intensity and color, i.e. a light image.

The chambers 14 can be any container defining an interior space, and, in the illustrated embodiment, are open at each end. In one embodiment, each chamber 14 comprises a glass cylinder with open ends. The chambers can be designed to break under certain conditions, such as application of sufficient mechanical force.

Figure 3:
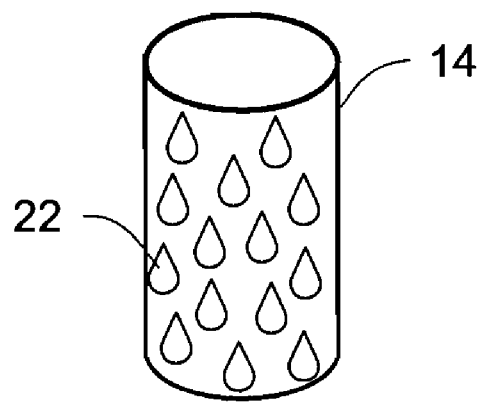
FIG. 3 is a detailed view of an optical signature chamber used in FIGS. 1 and 2.

With reference to FIG. 3, each chamber 14 contains a fluid 22 having optical properties suitable for producing an individual optical signature. These optical properties can include, for example, indices of refraction, opacity, and wavelength filtering or combinations thereof. In one embodiment, the optical properties of the fluid in each of the chambers 14 will be different whereby each chamber 14 produces a different individual optical signature. In other embodiments, some of the chambers can contain the same fluid or dissimilar fluids having the same optical properties so that they produce the same individual optical signatures. Nonetheless, not all chambers 14 will produce the same individual optical signature and the chambers 14 will be arranged such that the resulting optical signature for the entire system 10 is unique.

Any of a large number of different kinds of fluids can be used. The fluids can be, for example, optical coupling gels available from Dow Corning Corporation of Midland, Mich. The viscosity of the fluids in the chambers can vary from very viscous fluids such as liquids including water, to less viscous fluids such as gels. In addition, the fluids can be gases having differing optical properties.

The fluid in each chamber 14 can be homogenous or a mix of two or more fluids. Colorant can be added to the fluid to alter the color of the fluid.

The chambers 14 can be completely filled with fluid so that reorientation of the chambers does not alter the individual optical signatures. In another embodiment, the chambers are only partially filled with fluid. Thus, if the orientation of the chambers is altered sufficiently (for example by tilting the chambers from a vertical orientation shown in FIG. 1 to a horizontal orientation), the fluids shift within the chambers and the individual optical signatures are altered since the light path through the chambers changes.

Further, the fluids used are preferably optically stable so as to maintain their optical characteristics over time. Nonetheless, one or more of the fluids can be designed to optically degrade or change in some manner when exposed to certain operating conditions. For example, the optical properties of one or more of the fluids can be designed to change when the chambers are exposed to certain environmental conditions, such as temperature extremes or when exposed to x-rays, or when exposed to certain operational conditions, such as vibration or shock extremes.

The system 10 is preferably designed such that attempted tampering with the chamber(s) 14 or application of sufficient force to the chamber(s) destroys the chamber(s) or causes the fluids to spill from the chambers, which thereby alters the individual optical signatures that are created by the chambers. For sake of convenience, any event that causes the fluids to spill from the chambers will be described herein as a destructive event.

Returning to FIG. 1, in one exemplary operational use of the system 10, the individual optical signature of the chambers 14 are first established by the detectors 16 and the individual optical signatures saved in a suitable storage device such as random access memory of a data processing device. This establishes the signatures of each of the chambers 14, and thus establishes the unique fingerprint of the device 10 and the machine, mechanism, device, etc. that the device 10 is used with.

During operational use, light from the light source 12 is directed through the chambers 14 and the resulting optical signatures of all chambers 14 are detected by the detectors 16. For example, as discussed above, the detectors 16 can detect the light images produced by the chambers, which images are then compared to the expected light images which have previously been stored. If the light images match the stored images, a key bit sequence 24 can be created which is then compared to an expected key bit sequence to determine a match. If one or more of the detected light images does not match a stored image, the correct key bit sequence is not generated. Thus, an action or operation of equipment can be prevented, and/or a suitable notification can be sent warning of the error. In another embodiment, the generated key bit sequence can be inserted directly into a decryption algorithm. The failure to decrypt correctly would result in an inoperable equipment state.

The comparison of the detected optical signature to the expected optical signature can also be used as a simple go/no-go tool without creating a key bit sequence, whereby if there is a match an action can be permitted to take place or equipment allowed to operate. Conversely, if there is not a match, the action or operation of equipment can be prevented, and/or a notification can be sent warning of the error.

Instead of detecting a light image, the detectors can detect a light intensity of each chamber and compare the detected light intensity with a previously stored expected light intensity.

In addition, rather than comparing the detected optical signature(s) to a stored optical signature(s), the detected optical signature can be used as an input for another process. For example, the detected optical signatures can be represented in the digital world as a plurality of 1's and 0's as suggested by the key bit sequence 24. The 1's and 0's representing the detected optical signature can be fed into a random number generator which processes the numbers to create a code that is used to encrypt data that is sent to another location which must have the correct code to decrypt the data.

Figure 4:
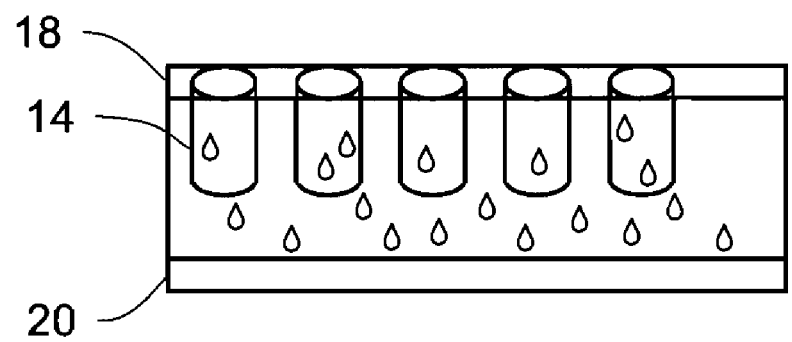
FIG. 4 illustrates the fluids in the signature chambers spilled from the optical signature chambers and mixed together.

If a destructive event occurs, the fluids are spilled from the chambers 14 as shown in FIG. 4 and mix with each other. Once the fluids mix, the optical signatures of each chamber cannot be recreated because one cannot tell which fluid came from which chamber. Therefore, destruction of the optical signature of the system 10 can be achieved by spilling the fluids from the chambers 14. Such destruction can be performed mechanically or manually, without the need for electric power.

The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. An optical signature system, comprising:
   at least one light source;
   a plurality of optical signature chambers each defining an interior space containing fluid, the fluids having differing optical properties whereby the plurality of optical signature chambers have differing individual optical signatures, the optical signature chambers have first and second ends, the second ends are closed and the first ends are closed by a cover that is light transmissive at least where the cover covers the first ends; and
   a plurality of optical signature detectors, each optical signature detector is positioned to simultaneously detect light exiting from a plurality of the optical signature chambers after the light has passed through the optical signature chambers from the at least one light source.

2. The optical signature system of claim 1, wherein the differing optical properties comprise differing indices of refraction.

3. The optical signature system of claim 1, wherein the fluid in each optical signature chamber is optical gel.

4. The optical signature system of claim 1, wherein the fluids are optically stable so as to maintain their optical characteristics.

5. The optical signature system of claim 1, wherein the fluid in each optical signature chamber is homogenous.

6. The optical signature system of claim 1, comprising more than two of the optical signature chambers, the optical signature chambers being arranged into a pattern comprising an array of rows and columns.

7. The optical signature system of claim 1, wherein each optical signal detector is associated with a respective one of the optical signature chambers, and each optical signal detector detects light exiting from its associated optical signature chamber and from optical signature chambers adjacent the associated optical signature chamber.

8. A method of generating a unique optical signature, comprising:
   simultaneously directing light through a plurality of optical signature chambers each of which defines an interior space containing a fluid, the fluids having differing optical properties whereby the optical signature chambers have differing individual optical signatures;
   simultaneously electrically detecting light that has been directed through the optical signature chambers using a plurality of optical signal detectors, each optical signal detector simultaneously detecting light exiting from a plurality of the optical signature chambers after the light has passed through the optical signature chambers from a light source; and
   generating a resulting optical signature from the light detected by the optical signal detectors.

9. The method of claim 8, wherein the differing optical properties comprise differing indices of refraction.

10. The method of claim 8, wherein the fluid in each optical signature chamber is optical gel.

11. The method of claim 8, wherein the light is coherent light.

12. The method of claim 8, wherein the fluid in each optical signature chamber is homogenous.

13. The method of claim 8, wherein each optical signal detector detects an image.

14. The method of claim 13, comprising comparing the images to stored images.

15. The method of claim 8, wherein generating a resulting optical signature comprises generating a key bit sequence.

16. The method of claim 8, wherein there are more than two of the optical signature chambers, each optical signal detector is associated with a respective one of the optical signature chambers, and each optical signal detector detects light exiting from its associated optical signature chamber and from optical signature chambers adjacent the associated optical signature chamber.

17. The method of claim 8, comprising simultaneously directing the light through a first end of the optical signature chambers, and simultaneously electrically detecting light that exits through a second end of the optical signature chambers.

18. The method of claim 8, comprising using the resulting optical signature as an input for another process.

19. The optical signature system of claim 1, wherein the optical signature chambers are not fluidly connected to one another.

20. The optical signature system of claim 7, wherein the cover is a first common cover, and the second ends are closed by a second common cover that is light transmissive at least where the second common cover covers the second ends, the first common cover is positioned between the light source and the optical signature chambers, the second common cover is positioned between the optical signature chambers and the optical signal detectors, and the first common cover and the second common cover are positioned between the light source and the optical signature detectors.

21. The optical signature system of claim 1, wherein each optical signature chamber has a first end and a second end, the light source is positioned so that light therefrom enters the optical signature chambers through the first ends, and the optical signal detectors are positioned to detect light that exits the optical signature chambers through the second ends.

* * * * *